United States Patent
Abe et al.

(10) Patent No.: US 8,593,498 B2
(45) Date of Patent: Nov. 26, 2013

(54) MEDIUM PROCESSING DEVICE, AND CONTROL METHOD FOR A MEDIUM PROCESSING DEVICE

(75) Inventors: Hiroki Abe, Shiojiri (JP); Masahiro Takei, Shiojiri (JP); Hideki Nishimura, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 84 days.

(21) Appl. No.: 13/235,267

(22) Filed: Sep. 16, 2011

(65) Prior Publication Data

US 2012/0069130 A1    Mar. 22, 2012

(30) Foreign Application Priority Data

Sep. 17, 2010 (JP) ................. 2010-209661

(51) Int. Cl.
    *B41J 2/435*      (2006.01)
    *B65H 85/00*      (2006.01)

(52) U.S. Cl.
    USPC ........................ 347/262; 347/264; 271/3.13

(58) Field of Classification Search
    USPC ............. 347/262–264; 271/3.13–3.17, 10.03, 271/265.01, 265.02; 198/464.1, 464.2, 576
    See application file for complete search history.

(56) References Cited

U.S. PATENT DOCUMENTS 6,095,631 A * 8/2000 Suzumura et al. ............ 347/22
2011/0043587 A1   2/2011 Kanno et al.

FOREIGN PATENT DOCUMENTS

| JP | 2002-068529 | A | | 3/2002 |
| JP | 2002068529 | A | * | 3/2002 |
| JP | 2005219860 | A | * | 8/2005 |
| JP | 2005-288994 | A | | 10/2005 |
| JP | 2009-241538 | A | | 10/2009 |

* cited by examiner

*Primary Examiner* — Hai C Pham
(74) *Attorney, Agent, or Firm* — Kilpatrick Townsend & Stockton LLP

(57) ABSTRACT

A hybrid processing device having printheads that records on a check conveyed through a medium conveyance path includes a first sensor that detects insertion of a check from the recording medium entrance of the medium conveyance path, a second sensor that detects discharge of the check from the recording medium exit of the medium conveyance path, and a third sensor that detects presence of a check between the first and second sensors. It is determined that the recording medium has been removed from the conveyance path, when the recording medium detectors change from a first state, in which at least one of the recording medium detectors detects that the recording medium is present, to a second state, in which none of the recording medium detectors detect that the recording medium is present.

21 Claims, 7 Drawing Sheets

MEDIUM PROCESSING DEVICE, AND CONTROL METHOD FOR A MEDIUM PROCESSING DEVICE

This application claims priority to Japanese Patent Application No. 2010-209661, filed Sep. 17, 2010, the entirety of which is incorporated by reference herein.

BACKGROUND

1. Technical Field

The present invention relates to a medium processing device that records on a recording medium, and a control method for the medium processing device.

2. Related Art

Medium processing devices that convey a medium along a medium conveyance path from an entrance to an exit and record information on the medium are generally known. For example, a check is inserted in a device that prints information on the check and then expels it. These devices have a medium insertion detector that detects insertion of a recording medium from the entrance to a medium conveyance path, a medium discharge detector that detects discharge of the recording medium from the exit of the medium conveyance path, and a recording means that records on the recording medium, are known from the literature. Medium processing devices of this type commonly use photosensors as the medium detectors for reasons including assembly precision. Photosensors can detect if a recording medium is present or not by emitting light from a light-emitting device, and then detecting the reflection when the recording medium is present and the reflection when the recording medium is not present by means of a photodetector. See, for example, Japanese Unexamined Patent Appl. Pub. JP-A-2002-68529.

Depending upon where the medium processing device is used, however, ambient light from the sun, for example, may enter from the paper entrance or paper exit and be picked up by one of the photodetectors in this type of medium processing device, and the medium processing device may incorrectly detect that recording medium is present when the recording medium is not present.

Detection errors caused by ambient light can be avoided in this situation by repeating the detection operation of the medium detectors several times, and recognizing the detection result (whether the recording medium is present or not) when the same detection result is received several times in succession. However, this configuration requires more time to validate the detection result of the medium detector, and if the user removes the recording medium from the conveyance path during this time, detecting that the recording medium was removed may not be possible.

SUMMARY

A medium processing device and a control method for a medium processing device according to the invention reliably determine whether the recording medium has been removed from the medium conveyance path.

An exemplary medium processing device includes a case defining a conveyance path therein. The path defines a recording medium entrance and a recording medium exit, and is configured for a recording medium to be conveyed along the path from the entrance to the exit. A recorder is provided, adjacent the conveyance path, to record information on the recording medium. A pair of first conveyance rollers is provided to convey the recording medium from the recording medium entrance to a position farther downstream the conveyance path. A pair of second conveyance rollers is provided to discharge the recording medium from within the conveyance path out through the recording medium exit. A first recording medium detector is provided adjacent the conveyance path downstream of the first conveyance rollers, and detects whether the recording medium is present. A second recording medium detector is provided adjacent the conveyance path upstream of the second conveyance rollers and downstream of the first recording medium detector, and detects whether the recording medium is present. A third recording medium detector is provided downstream of the recording medium exit adjacent a line extending from the conveyance path, and detects whether the recording medium is present. It is determined that the recording medium has been removed from the conveyance path, when the recording medium detectors change from a first state, in which at least one of the recording medium detectors detects that the recording medium is present, to a second state, in which none of the recording medium detectors detect that the recording medium is present.

This aspect of the invention reduces the effect of ambient light entering from the conveyance path entrance or exit in particular, and can reliably detect if the recording medium has been pulled out of the conveyance path by means of a simple configuration even when medium detection by the medium detectors is performed plural times at a specific interval to detect if a recording medium is present.

A fourth recording medium detector may be provided adjacent the conveyance path, between the entrance and the pair of first rollers, to detect whether the recording medium is present.

A reader, to obtain information from the recording medium, such as a magnetic ink character recognition head, may be provided adjacent the conveyance path, such as between the entrance and the pair of first rollers.

The fourth recording medium detector may be upstream from the reader.

At least one of the recording medium detectors may be a photosensor including a light-emitting device and a photodetector. The recording medium detectors may each perform an emitter-OFF reading operation that detects the light sensed by the photodetector when the light-emitting device does not emit, and an emitter-ON reading operation that detects the light sensed by the photodetector when the light-emitting device emits. The photosensors may detect if the recording medium is present based on the difference between the values detected in the emitter-OFF and emitter-ON reading operations.

This aspect of the invention can suppress the effect of sunlight and other ambient light, and accurately detect if a recording medium is present.

The recording medium detectors may periodically operate to detect if the recording medium is present, and whether the recording medium is present may be determined when the same detection result is received at two consecutive operations.

This aspect of the invention can improve the accuracy of detecting if the recording medium is present even when the ambient light is strong and the difference between the emitter-ON and emitter-OFF read values is small, and can more accurately detect recording media.

The distance between the second recording medium detector and the third recording medium detector, measured along the conveyance path, may be less than the length of the recording medium.

This aspect of the invention can accurately detect if the recording medium is present by means of the second recording medium detector or third recording medium detector detecting if the recording medium is present.

Two recorders may be provided: one to record on a first face of the recording medium, and the other to record on a second face of the recording medium. The first recorder may be between the first recording medium detector and the second recording medium detector, and the second recorder may be between the second recording medium detector and the third recording medium detector. This aspect of the invention enables efficiently arranging various parts to the conveyance path of the medium processing device while also reliably detecting when the recording medium has been pulled out.

A control method for a medium processing device is also provided. Data regarding the presence or absence of a recording medium from the recording medium detectors is received; and it is determined that the recording medium has been removed from the conveyance path when the recording medium detectors change from a first state, in which at least one of the recording medium detectors detects that the recording medium is present, to a second state, in which none of the recording medium detectors detect that the recording medium is present.

Embodiments of the invention suppress the negative effects of ambient light, and can therefore reliably detect if the recording medium has been pulled out of the conveyance path, and have a simple configuration even when medium detection by the medium detectors is performed plural times at a specific interval to detect if a recording medium is present.

Other features together with a fuller understanding of the invention will become apparent and appreciated by referring to the following description and claims taken in conjunction with the accompanying drawings.

DESCRIPTION OF EMBODIMENTS

An exemplary embodiment of the present invention is described below with reference to the accompanying figures.

Figure 1:
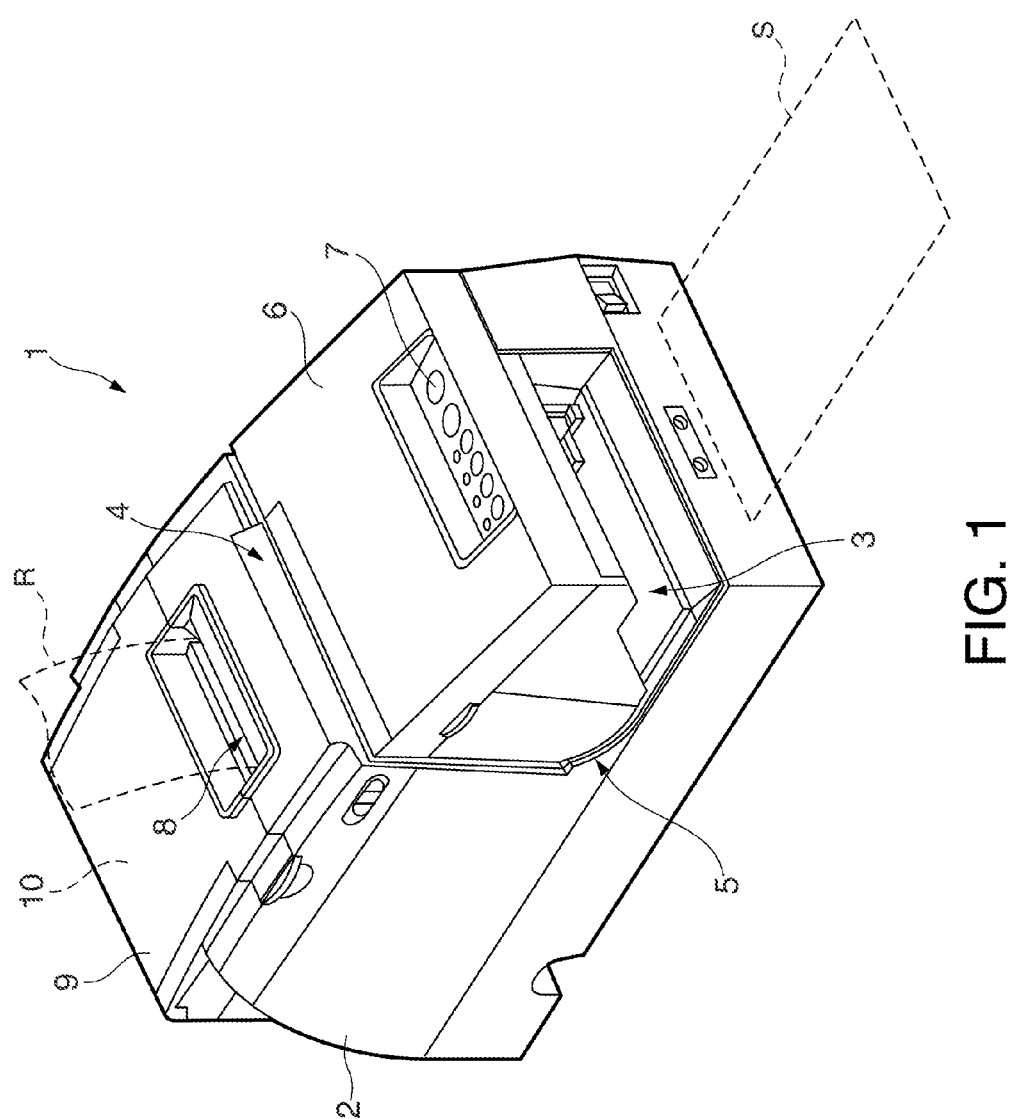
FIG. 1 is an external isometric view of a hybrid processing device according to many embodiments.

FIG. 1 is an external isometric view of a hybrid processing device as an example of a medium processing device. This hybrid medium processing device 1 reads a line of magnetic ink characters recorded on a recording medium such as a check S using magnetic ink character recognition (MICR). Based on the result of the content, the hybrid processing device 1 records information on the check S, such as by printing on the check, and records information, such as by printing, on roll paper R.

As shown in FIG. 1, the hybrid processing device 1 has a basically rectangular box-like case 2. A recording medium entrance 3 for inserting a check S is provided transversely to the device at the front left side of the case 2. A recording medium exit 4 from which the processed check S is discharged is provided transversely to the device in the top of the case 2 in the middle of the longitudinal direction, that is, between the front and back of the device. A medium conveyance path 5 extends from the recording medium entrance 3 in a curve rearwards and upwards to the recording medium exit 4. The recording medium entrance 3, recording medium exit 4, and medium conveyance path 5 are open at the left side of the case 2, enabling conveying a check S that is wider than the medium conveyance path 5.

A top cover 6 covers the top of the case 2 in front of the recording medium exit 4, and an operating panel 7 used to operate the hybrid processing device 1 is disposed at the front end of the top cover 6. A roll paper exit 8 from which the roll paper R is discharged after printing is provided transversely to the device in the top of the case 2 behind the recording medium exit 4. An access cover 9 is also provided on the top of the case 2 behind the roll paper exit 8, and this access cover 9 is attached pivotably at the rear end thereof to the case 2. When the access cover 9 opens, the roll paper compartment 10 that stores the roll paper R is exposed and the roll paper R can be replaced. The roll paper R is a web of thermal paper wound onto a core in a roll.

Figure 2:
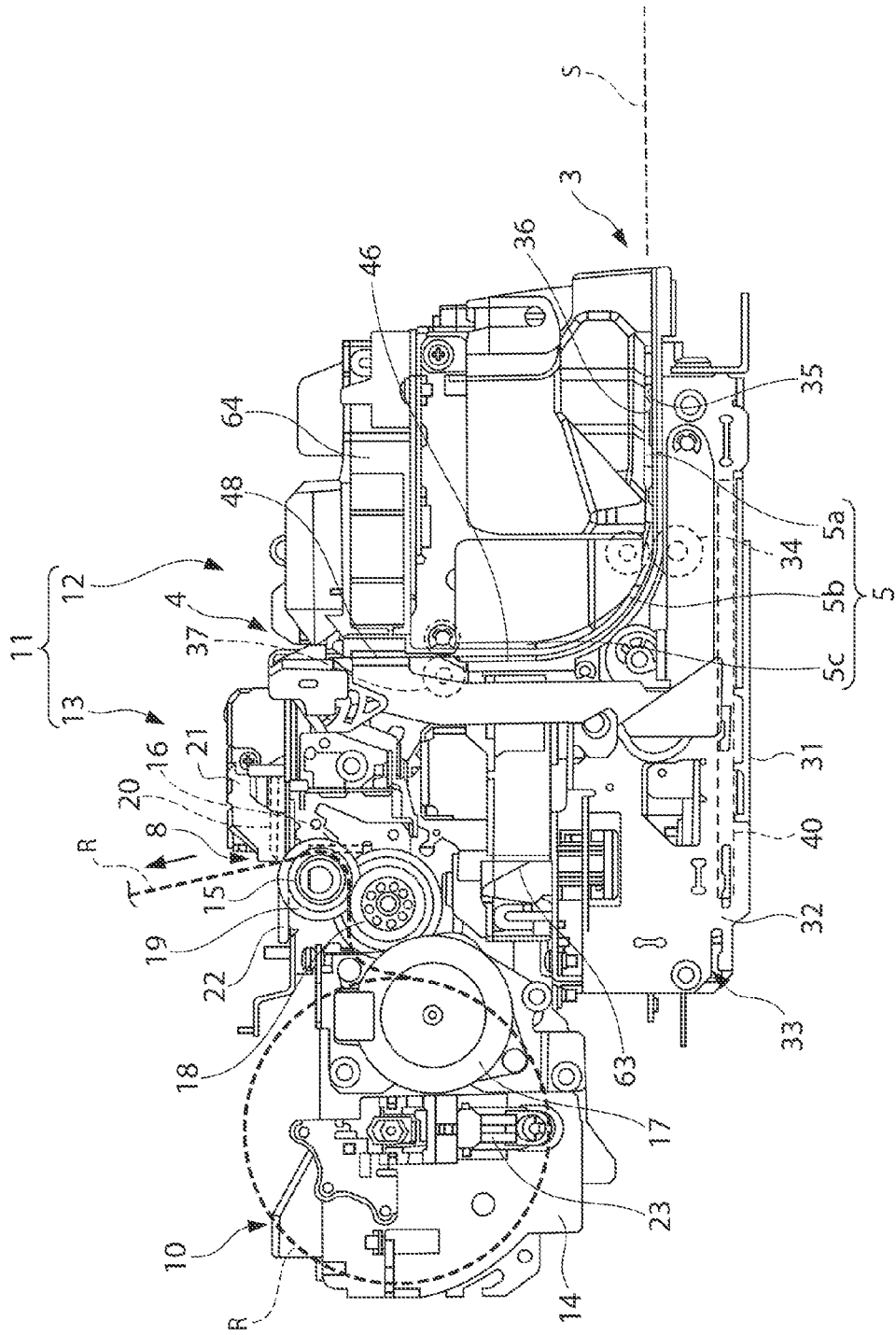
FIG. 2 is a schematic side view of the main unit of the hybrid processing device of FIG. 1.

FIG. 2 is a side view showing relevant components of the hybrid processing device 1. FIG. 2 shows the hybrid processing device 1 with the case 2, top cover 6, access cover 9, and other exterior parts removed. As shown in FIG. 2, the hybrid processing device 1 has a main unit 11, and the main unit 11 includes a slip print unit 12 for printing on checks S and other slips, and a roll paper print unit 13 for printing on roll paper R, which operate in parallel.

The roll paper print unit 13 includes a left side frame 14 and a paired right side frame (not shown), and a roll paper holder (not shown) disposed between the side frames and forming the bottom, front, and back sides of the roll paper compartment 10. This roll paper holder holds the roll paper R so that the roll paper can rotate freely, and assures that the roll paper R can roll freely inside the roll paper compartment 10.

A platen roller 15 is provided freely rotatably between the left and right side frames near the roll paper exit 8.

A thermal printhead 16 is disposed in front of the platen roller 15 at a position opposite the platen roller 15, and the thermal printhead 16 has a plurality of heating resistors in the face thereof opposing the platen roller 15. The leading end of the roll paper R stored in the roll paper compartment 10 is held between the platen roller 15 and thermal printhead 16, and is conveyed toward the roll paper exit 8 by rotation of the platen roller 15. When the roll paper R passes between the platen roller 15 and thermal printhead 16, content such as text and images is recorded on the roll paper R by heat emitted from the thermal printhead 16. A roll paper conveyance motor 17 is provided on the left side frame 14. Rotation of the roll paper conveyance motor 17 is transferred through an intermediate gear 18 to a drive gear 19, which is coaxial with the platen roller 15, and the platen roller 15 turns.

An automatic paper cutter unit 21 with an internal movable knife 20 and a cutter drive motor 24 (see FIG. 4) for operating the movable knife 20 is disposed above the platen roller 15. A fixed knife 22 is disposed behind the automatic paper cutter unit 21 with the roll paper exit 8 therebetween. The leading end of the roll paper R passes between the movable knife 20 and fixed knife 22 to the roll paper exit 8, and the cutter drive motor 24 causes the movable knife 20 to move rearward toward the fixed knife 22, to thereby cut the roll paper R.

A remaining roll paper sensor 23, which detects how much roll paper R remains inside the roll paper compartment 10, is also provided on the left side frame 14.

As shown in FIG. 2, the slip print unit 12 has a main frame 33 including a base frame 31 and a left side frame 32 and a right side frame (not shown in the figure) that rise from the base frame 31. A pair of top and bottom paper guide members forming a bottom guide surface 35 and a top guide surface 36 are provided on the main frame 33, and the gap between the bottom guide surface 35 and top guide surface 36 defines the medium conveyance path 5. This medium conveyance path 5 includes a first, horizontal conveyance path portion 5a that extends from the recording medium entrance 3 horizontally toward the back of the device, a second, curved conveyance path portion 5b that curves upward from the back end of the horizontal conveyance path portion 5a, and a third, vertical conveyance path portion 5c that extends up from the top end of the curved conveyance path portion 5b and connects to the recording medium exit 4.

A pair of first conveyance rollers 34 is disposed in mutual opposition to the bottom guide surface 35 and top guide surface 36 near the junction between the horizontal conveyance path portion 5a and curved conveyance path portion 5b. A pair of second conveyance rollers 37 is disposed in opposition at the bottom guide surface 35 and top guide surface 36 of the vertical conveyance path portion 5c. The first conveyance rollers 34 and the second conveyance rollers 37 rotate when driven by the slip conveyance motor 38 (FIG. 4) and convey the check S.

The first conveyance rollers 34 and second conveyance rollers 37 are configured so that at least one roller of each roller pair can move toward and away from the other roller, to open and close the medium conveyance path 5, by a roller opening motor 39 (FIG. 4) connected to the one roller of each pair.

A control circuit board 40 that controls the operation of the hybrid processing device 1 based on a control program is also provided on the base frame 31.

Figure 3:
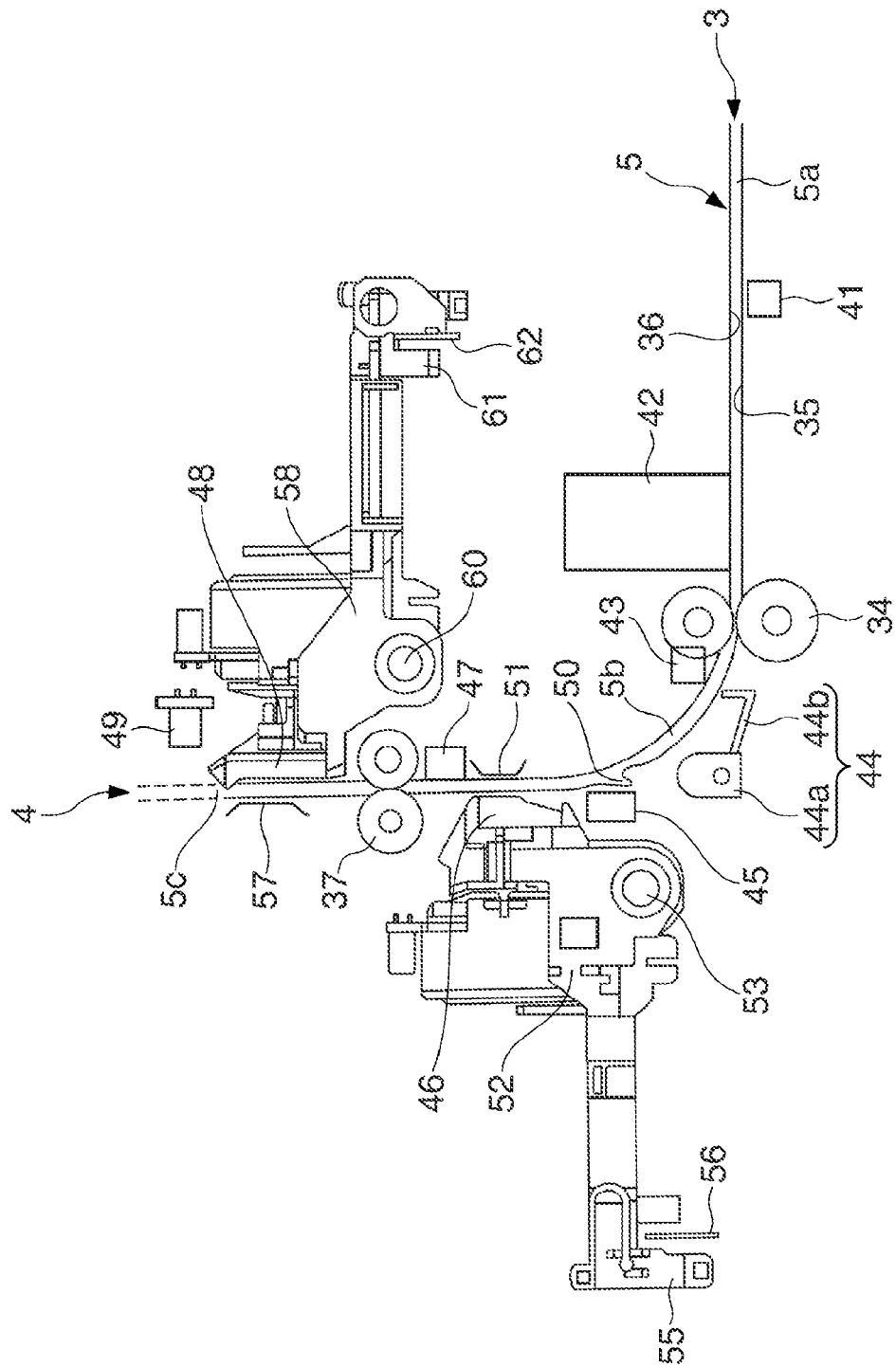
FIG. 3 is an enlarged view of relevant portions of FIG. 2.

FIG. 3 shows some relevant components located along the medium conveyance path 5.

Provided along the medium conveyance path 5, in sequence from the recording medium entrance 3 side, are a bottom of form sensor 41, MICR head 42, first conveyance rollers 34, top of form sensor 43, alignment device 44, validation sensor 45, first printhead 46, middle of paper pass sensor 47, second conveyance rollers 37, second printhead 48, and slip ejection sensor 49.

Figure 4:
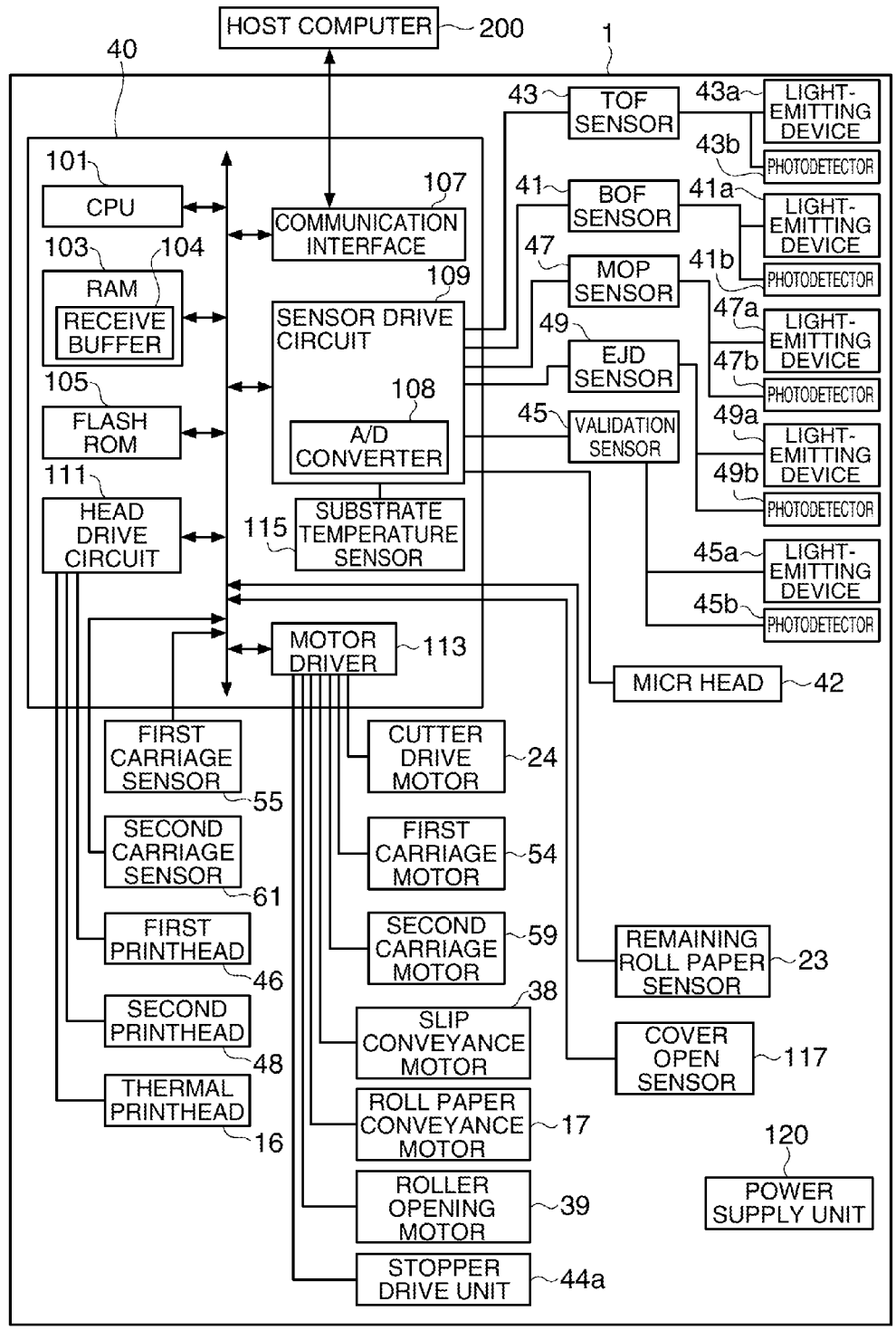
FIG. 4 is a block diagram of the functional configuration of the hybrid processing device of FIG. 1.

The sensors 41, 43, 45, 47, 49 are, for example, transmissive or reflective photosensors, and each includes a light-emitting device 41a, 43a, 45a, 47a, 49a (FIG. 4), and photodetector 41b, 43b, 45b, 47b, 49b (FIG. 4). Based on the amount of light detected by the respective photodetectors 41b, 43b, 45b, 47b, 49b, the sensors contactlessly detect the presence of a check S at their respective positions on the medium conveyance path 5.

The bottom of form sensor 41 detects the trailing end of a check S inserted from the recording medium entrance 3, and is disposed at the bottom guide surface 35 near the recording medium entrance 3.

The top of form sensor 43 detects the leading end of a check S inserted from the recording medium entrance 3, and is disposed at the top guide surface 36 downstream of the first conveyance rollers 34.

The slip ejection sensor 49 detects discharge of a check S processed by the slip print unit 12 from the recording medium exit 4, and is disposed near the recording medium exit 4.

The middle of paper pass sensor 47 detects the presence of a check S conveyed through the medium conveyance path 5, and is disposed to the top guide surface 36 on the side closer to the paper entrance than the second conveyance rollers 37.

The slip print unit 12 in this embodiment of the invention can validate the check S by printing on it with the first printhead 46 and second printhead 48, and then discharges the check S from the recording medium exit 4. A recess 50 is provided to align the check S when the trailing end of the check S enters the recess 50. The recess 50 is disposed at the upper end of the curved conveyance path portion 5b of the medium conveyance path 5. The validation sensor 45 detects entry of the trailing end of the check S to the recess 50, and is disposed adjacent the recess 50.

The MICR head 42 reads magnetic ink characters recorded on the surface of a check S, and is provided at the top guide surface 36 in the horizontal conveyance path portion 5a of the medium conveyance path 5. The validity of a check S is determined based on the data read by the MICR head 42.

The alignment device 44 pauses the check S inserted from the recording medium entrance 3, and is disposed downstream of the top of form sensor 43. The alignment device includes a stopper drive unit 44a such as a solenoid, for example, and a stop 44b that moves in and out of the medium conveyance path 5 according to how the stopper drive unit 44a is operated. The check S is aligned by the leading end of the check S stopping at the stop 44b.

The first printhead 46 prints endorsement information, which may be required by the business, such as a customer identification number, date, and check amount, on the back side of the check S conveyed through the medium conveyance path 5, and may be a serial impact dot matrix (SIDM) printhead that prints by striking an ink ribbon with recording wires to transfer ink from the ink ribbon onto the recording medium. This first printhead 46 is located at the lower end of the vertical conveyance path portion 5c of the medium conveyance path 5. A first platen 51 is provided, widthwise along the main frame 33 (FIG. 2), opposite the first printhead 46 with the vertical conveyance path portion 5c therebetween. The first printhead 46 is mounted on a first carriage 52 disposed behind the vertical conveyance path portion 5c. This first carriage 52 can slide freely along a first carriage shaft 53 disposed horizontally between the side frames of the main frame 33 (FIG. 2), and moves bidirectionally along the first carriage shaft 53 when driven by a first carriage motor 54 (FIG. 4), to which the first carriage 52 is connected by an intervening timing belt (not shown in the figure). This first carriage motor 54 is a stepper motor, and can move the first carriage 52 the distance equivalent to a desired number of steps as controlled by the control circuit board 40.

A first carriage sensor 55, which detects the position of the first carriage 52, is provided at the bottom of the first carriage 52. This first carriage sensor 55 is a transmissive photosensor, and scans a first scale 56 disposed substantially parallel to the first carriage shaft 53 in conjunction with the bidirectional movement of the first carriage 52.

Multiple slits of a specified width are formed in this first scale 56, and the position of the first carriage 52, and thus of the first printhead 46, is detected by capturing the optical signals passing these slits as the first carriage sensor 55 scans the first scale 56. Power may be supplied to the first carriage sensor 55 only while driving the first carriage motor 54, and stopped when the first carriage motor 54 stops; thus power consumption is reduced while waiting.

The second printhead 48 prints the payee, date, check amount, and/or other relevant information on the front of the check S, and may be a SIDM printhead, similar to the first printhead 46. This second printhead 48 is located above the first printhead 46, and is disposed on the front side of the vertical conveyance path portion 5*c*. A second platen 57 is provided widthwise across the main frame 33 (FIG. 2) opposite the second printhead 48 with the vertical conveyance path portion 5*c* therebetween.

Like the first printhead 46, the second printhead 48 is carried on a second carriage 58, which is driven bidirectionally along a second carriage shaft 60 by a second carriage motor 59.

A second carriage sensor 61 is provided at the bottom of the second carriage 58, and this second carriage sensor 61 scans a second scale 62 disposed substantially parallel to the second carriage shaft 60 in conjunction with bidirectional movement of the second carriage 58.

The second carriage motor 59 may also be a stepper motor, similar to the first carriage motor 54.

A first ink ribbon cassette 63 (FIG. 2) and a second ink ribbon cassette 64 (FIG. 2) that store the ink ribbons that are conveyed respectively between the first printhead 46 and first platen 51 and the second printhead 48 and second platen 57 are removably installed on the main frame 33.

FIG. 4 is a block diagram showing the functional configuration of the hybrid processing device 1.

As shown in FIG. 4, the control system of the hybrid processing device 1 includes various drive units such as motors and various sensors connected to a control unit mounted on the control circuit board 40.

The control circuit board 40 includes a CPU 101 (decision unit) that executes a control program and controls other parts; RAM 103 that temporarily stores processed data and the programs executed by the CPU 101; flash ROM 105 that stores settings and the basic control program executed by the CPU 101; a communication interface 107 that communicates commands and data with a host computer 200 as an external device connected to the hybrid processing device 1; a sensor drive circuit 109 that has an internal A/D converter 108 and converts output from the sensors of the hybrid processing device 1 to digital data and outputs to the CPU 101; a head drive circuit 111 that drives the printheads of the hybrid processing device 1; and a motor driver 113 that drives the motors of the hybrid processing device 1. These parts are communicably connected to each other. Note, further, that the specifics of the various functional parts of the control circuit board 40 can be selected as desired, including selecting discrete semiconductor devices as individual units, and/or implementing the functions of plural functional parts using a system-on-a-chip (SOC) design.

A substrate temperature sensor 115 that detects the temperature of the motor driver 113 is mounted on the control circuit board 40. The substrate temperature sensor 115 is a thermistor disposed on the back side of the control circuit board 40 where the motor driver 113 is mounted, or near the motor driver 113.

Also provided are a remaining roll paper sensor 23 that detects whether the amount of roll paper R stored in the roll paper compartment 10 (FIG. 1) exceeds a particular amount, a cover open sensor 117 that detects if the access cover 9 is open, and the first and second carriage sensors 55, 61 described above, are all connected to the CPU 101.

The remaining roll paper sensor 23 is a switch that turns on when the outside diameter of the roll paper R is greater than or equal to a set size, the cover open sensor 117 is a switch that turns on when the access cover 9 opens. Both these sensors change the output value to high or low according to the respective on/off state. The first carriage sensor 55 and second carriage sensor 61 are photo interrupters, for example, and switch the output HIGH/LOW according to whether or not the amount of light detected by the light receiving unit exceeds an internally stored threshold value.

The CPU 101 controls various electronic components mounted on the control circuit board 40 by reading and executing the basic control program stored in flash ROM 105. Based on the sensor values input through the sensor drive circuit 109, and the output values of the remaining roll paper sensor 23, cover open sensor 117, first carriage sensor 55, and second carriage sensor 61, the CPU 101 performs operations including monitoring the operating status of the hybrid processing device 1, driving the print heads by means of the head drive circuit 111, operating the motors by means of the motor driver 113, printing on the front and back sides of the check S, reading the MICR line, and printing on the roll paper R.

RAM 103 is used as working memory for temporarily storing programs and data used for CPU 101 operation. A receive buffer 104 that temporarily stores commands and data received from the host computer 200 through the communication interface 107 is provided in RAM 103. The CPU 101 reads and executes the commands stored in the receive buffer 104 in the order received.

The sensor drive circuit 109 is connected to the bottom of form sensor 41, top of form sensor 43, validation sensor 45, middle of paper pass sensor 47, slip ejection sensor 49, and substrate temperature sensor 115, converts the sensor output values to digital data, and outputs the digital data to the CPU 101. The sensor drive circuit 109 is also connected to the MICR head 42, and outputs the output values of the MICR head 42 as digital data to the CPU 101 while reading the magnetic ink characters printed on the check S by means of the MICR head 42.

The head drive circuit 111 prints on a check S by energizing the solenoid coils of the first printhead 46 and second printhead 48 to make the recording wires strike the ink ribbon as controlled by the CPU 101. The head drive circuit 111 also energizes the heating elements (not shown in the figure) of the thermal printhead 16 as controlled by the CPU 101 to apply heat to and thus record on the recording surface of the roll paper R.

The motor driver 113 outputs drive power and drive pulses as controlled by the CPU 101 to the roll paper conveyance motor 17, cutter drive motor 24, slip conveyance motor 38, roller opening motor 39, stopper drive unit 44*a*, first carriage motor 54, and second carriage motor 59, which are stepper motors. The drive power supplied to the motors by the motor driver 113 is 24-VDC power supplied from the power supply unit 120 to the different electronic components. The power supply unit 120 supplies DC power to the drive units of the hybrid processing device 1 shown in FIG. 4, that is, the printheads (first printhead 46, second printhead 48, and thermal printhead 16), motors (cutter drive motor 24, first carriage motor 54, second carriage motor 59, slip conveyance motor 38, roll paper conveyance motor 17, and roller opening motor 39), the stopper drive unit 44*a*, and the control circuit board 40. Power is also supplied from the power supply unit 120 to the sensors of the hybrid processing device 1 through the control circuit board 40, or through the sensor drive circuit 109 mounted on the control circuit board 40.

This hybrid processing device 1 enters a standby mode after the power turns on. In this standby mode the hybrid processing device 1 moves the first conveyance rollers 34 and second conveyance rollers 37 to the open position by means of the roller opening motor 39, and a check S can be inserted to the recording medium entrance 3. The stop 44*b* is also moved into the medium conveyance path 5 by means of the stopper drive unit 44*a*.

When insertion of a check S from the recording medium entrance 3 is detected in this standby state, the CPU 101 detects the check S based on the output value of the bottom of form sensor 41 input from the sensor drive circuit 109. The CPU 101 then controls the motor driver 113 to drive the roller opening motor 39 and move the first conveyance rollers 34 and second conveyance rollers 37 to the closed position so that the check S is held by the first conveyance rollers 34.

With the stop 44b intervening in the medium conveyance path 5, the CPU 101 then operates the slip conveyance motor 38 and rotationally drives the first conveyance rollers 34 to align the check S by moving it back and forth plural times. This operation drives the check S against the stop 44b and aligns its orientation.

When reading magnetic ink characters is instructed by a command received from the host computer 200, the CPU 101 drives the stopper drive unit 44a and retracts the stop 44b from the medium conveyance path 5.

The CPU 101 then reads the magnetic ink characters on the check S based on output values from the MICR head 42 while conveying the check S by means of the first conveyance rollers 34.

When printing on the back of the check S is instructed by a command received from the host computer 200, the CPU 101 conveys the check S to the printing position and then prints on the back of the check S by means of the first printhead 46.

When printing on the front of the check S is instructed by a command received from the host computer 200, the CPU 101 conveys the check S to the front printing position. Depending on the desired printing position, the CPU 101 drives the slip conveyance motor 38 either forward or in reverse to convey the check S downstream or upstream, respectively. After the check S reaches the desired front printing position, the CPU 101 controls the head drive circuit 111 and prints on the front of the check S by means of the second printhead 48.

After printing the check front, the CPU 101 drives the slip conveyance motor 38 and conveys the check S to where it can be discharged from the recording medium exit 4 by means of the second conveyance rollers 37.

The check S then reaches a position protruding from the recording medium exit 4, but the trailing end of the check S is still inside the path 5 and its presence is detected by the slip ejection sensor 49. The CPU 101 waits until the operator removes the check S, and when the check S is removed, the CPU 101 detects its removal and drives the roller opening motor 39 and stopper drive unit 44a, and returns to the standby mode described above. As a result, the magnetic ink characters are read and the front and back of the check S are printed when a check S is inserted.

When a check S is inserted from the recording medium exit 4 in the standby mode and the leading end thereof reaches the recess 50, the CPU 101 detects insertion of a check S based on change in the output from the validation sensor 45. The CPU 101 then validates the check S using the first printhead 46 or second printhead 48 according to a print command received from the host computer 200. When printing is completed, the CPU 101 waits for the operator to remove the check S. When removal of the check S is detected based on change in output from the validation sensor 45 and slip ejection sensor 49, the CPU 101 returns to the standby mode.

When a command for printing on roll paper R is received from the host computer 200, the CPU 101 reads and executes the command from the receive buffer 104. The CPU 101 prints by energizing the thermal printhead 16 and applying heat to the printing surface of the roll paper R while driving the roll paper conveyance motor 17 and conveying the roll paper R. When printing is completed, the CPU 101 conveys the roll paper R until the end of the printed position on the roll paper R is at the automatic paper cutter unit 21, and then drives the cutter drive motor 24 to cut the roll paper R.

As described above, photosensors including a bottom of form sensor 41, top of form sensor 43, validation sensor 45, middle of paper pass sensor 47, and slip ejection sensor 49 are disposed to the medium conveyance path 5 in the hybrid processing device 1 according to this embodiment of the invention. Depending on the installation conditions of the hybrid processing device 1, ambient light from the sun or other sources can sometimes enter the recording medium entrance 3 or recording medium exit 4, and this ambient light may be picked up by the photodetector of each photosensor assembly. As a result, a check S may be mistakenly detected as present even though there is no check S in the medium conveyance path 5.

Figure 5:
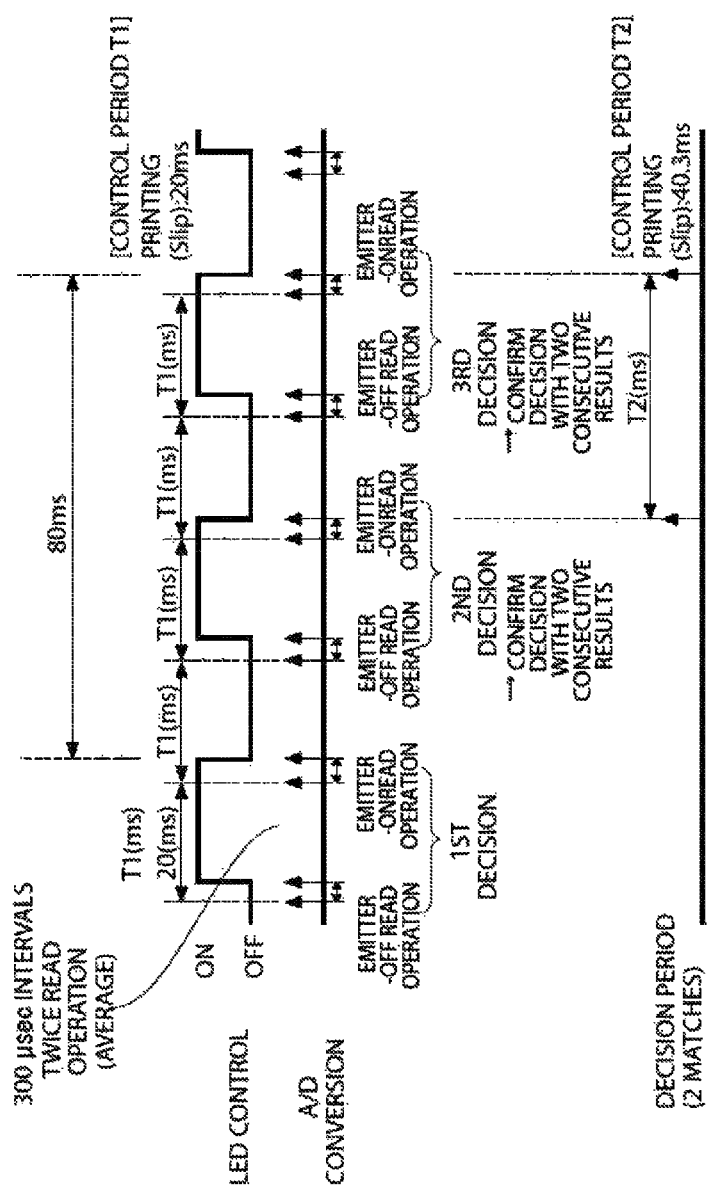
FIG. 5 is a timing chart of sensor operation for use with the device of FIG. 1.

Therefore, in some exemplary embodiments, each sensor alternates an emitter-OFF read operation and an emitter-ON read operation, each for a length of time T1 (such as 20 msec). This emitter-OFF read operation detects the amount of light sensed by the photodetector when the light-emitting device (LED) does not emit, and the emitter-ON read operation detects the amount of light sensed by the photodetector when the LED emits. The specific time T2 required to execute the emitter-OFF read and emitter-ON read operations is therefore 40 msec in the embodiment illustrated in FIG. 5. The average of two values detected a specific time apart (such as 300 μsec) is used for the emitter-OFF read and emitter-ON read operations.

The presence of a check S is then detected based on the difference between the emitter-OFF read and emitter-ON read values. These operations are performed by the sensor drive circuit 109 as controlled by the CPU (decision means) 101. This configuration performs an emitter-OFF read to detect the amount of light sensed by the photodetector when the LED does not emit, and an emitter-ON read to detect the amount of light sensed by the photodetector when the LED emits, and detects whether or not a check S is present based on the difference between the emitter-OFF and emitter-ON read values. This embodiment of the invention can therefore better alleviate problems due to ambient light and detect if a check S is present with better precision than typical configurations, which only take readings when a LED emits.

Some exemplary embodiments repeat detecting if a check S is present several times, and determine that a check S is present when the same result is obtained twice consecutively, providing even better accuracy if the ambient light is strong and the difference between the emitter-OFF read and emitter-ON read values is small. In this instance, it will be appreciated that determining if a check S is present can be difficult. When the check S detection operation is performed several times, and a check S is determined to be present when the same result is obtained twice consecutively, accuracy is improved when the ambient light is strong and the difference between the emitter-OFF and emitter-ON read values is small, and enables more reliably detecting a check S.

In the example above, the detection result is confirmed when the same OFF and ON detection results are obtained twice consecutively; thus a maximum of 2T2=4T1 (e.g. 80 msec in the embodiment of FIG. 5) is required to confirm the detection result of each sensor. Furthermore, because the check S is conveyed at a specified conveyance speed (e.g. 195 mm/sec), the check S will be conveyed a maximum distance, (e.g. 15.6 mm=195.0.08) during this time. The leading end of the check S is protruding from the recording medium exit 4 at this time, and if the user removes the check S from the conveyance path while detection is unconfirmed, detecting removal of the check S may not be possible.

However, the middle of paper pass sensor 47 detects removal of a check S in this instance.

In some embodiments, the middle of paper pass sensor 47 is provided at the vertical conveyance path portion 5c of the medium conveyance path 5 between the first printhead 46 and second printhead 48, which is an efficient arrangement, and removal of a check S can be reliably detected.

The operation determining removal of a check S is described next.

Figure 6:
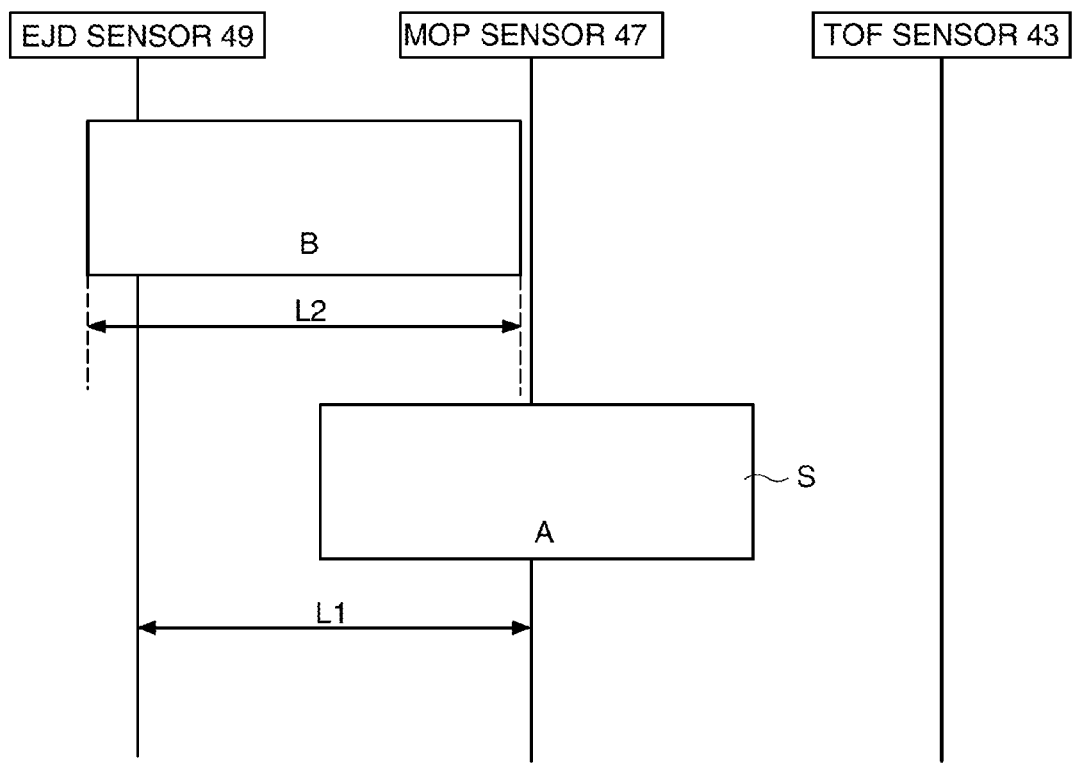
FIG. 6 schematically illustrates the relative positions of the middle of paper pass sensor and a conveyed check S in the device of FIG. 1.
Figure 7:
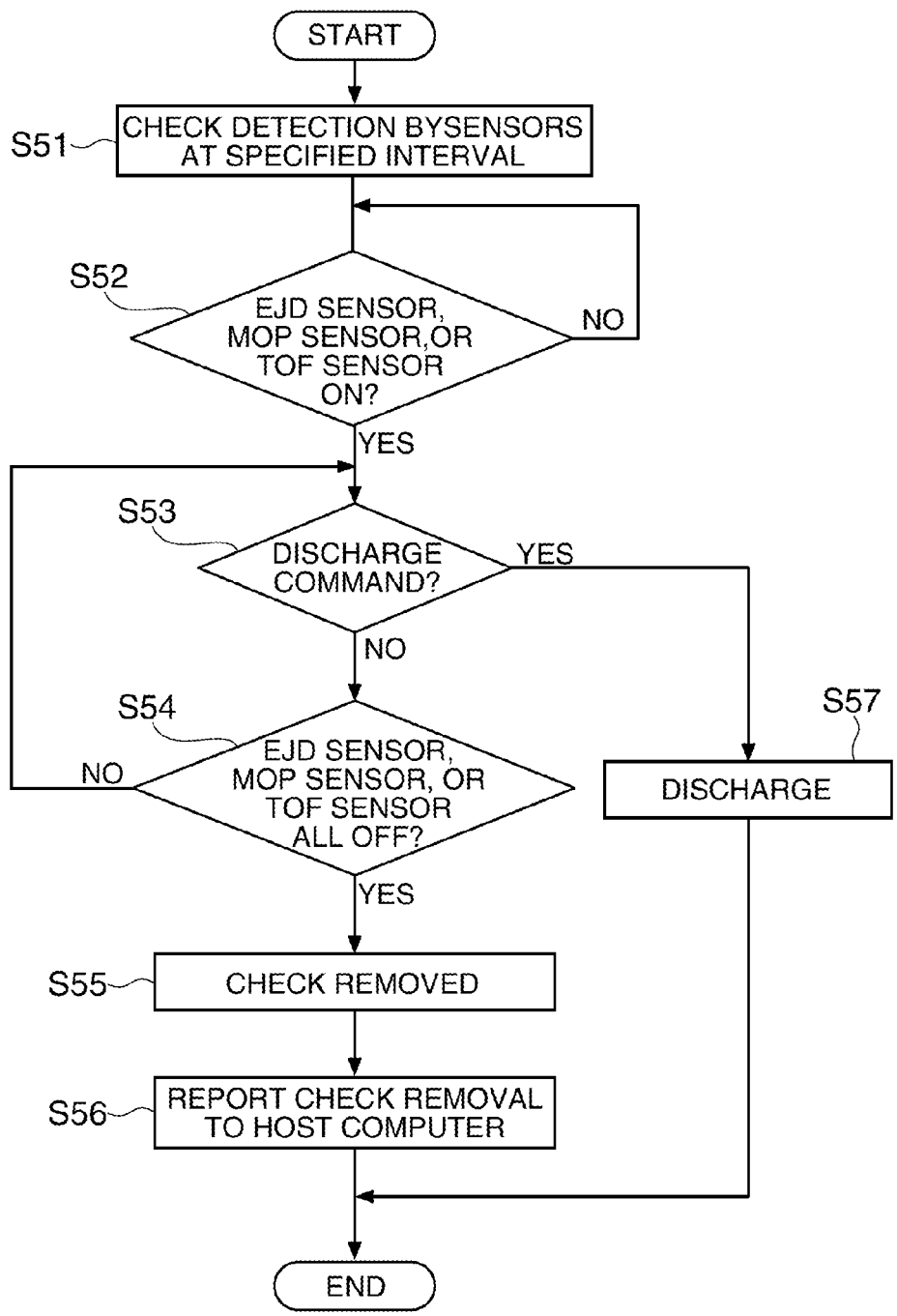
FIG. 7 is a flow chart showing a decision-making method, according to many embodiments.

FIG. 6 shows the relative positions of the middle of paper pass sensor 47 and the conveyed check S in an exemplary embodiment, and FIG. 7 is a flow chart of the decision-making process.

As shown in FIG. 6, the middle of paper pass sensor 47 may be located between the top of form sensor 43 and slip ejection sensor 49, and is more specifically disposed so that the distance L1 to the slip ejection sensor 49 is shorter than the length L2 (e.g. 63 mm) in the conveyance direction of the shortest check S that is processed by the hybrid processing device 1.

The CPU 101 first drives the sensor drive circuit 109 to detect a check S by means of the sensors (step S51). In this case the sensor drive circuit 109 executes the emitter-OFF read and emitter-ON read operations at time T1, and outputs the results to the CPU 101.

The CPU 101 then determines if the middle of paper pass sensor 47, top of form sensor 43, or slip ejection sensor 49 is on (step S52).

If the middle of paper pass sensor 47 is ON, a check S has been conveyed to the middle of paper pass sensor 47 as shown by A in FIG. 6, the middle of paper pass sensor 47 has detected the check S, and the decisions based on the emitter-OFF and emitter-ON read values indicate twice consecutively that a check S is present. An ON signal from the other sensors indicates a similar state, and an OFF signal indicates that the decisions based on the emitter-OFF and emitter-ON read values twice consecutively indicate that a check S is not present.

If none of the medium detection sensors (the middle of paper pass sensor 47, top of form sensor 43, and slip ejection sensor 49) is on (step S52 returns No), the process repeats until a sensor turns on, and if any sensor is on (step S52 returns Yes), the process goes to step S53.

If only the middle of paper pass sensor 47 detects a check S, the leading end of the check S is not protruding from the recording medium exit 4 (FIG. 3) and the check S cannot be pulled out.

If a command for discharging the check S is received from the host computer 200 (step S53 returns Yes), the CPU 101 reads the command from receive buffer 104 and performs a check S discharge operation (step S57).

If a command for discharging the check S is not received from the host computer 200 (step S53 returns No), the CPU 101 determines if the middle of paper pass sensor 47, top of form sensor 43, and slip ejection sensor 49 are all OFF (step S54). If all of these sensors are not off (step S54 returns No), the process repeats until they turn off. When all sensors are off (step S54 returns Yes), the process goes to step S55.

When the middle of paper pass sensor 47, top of form sensor 43, and slip ejection sensor 49 are all off, the trailing end of the check S is removed from the middle of paper pass sensor 47, and removal of the check S can be detected (step S55).

Because the distance L1 between the middle of paper pass sensor 47 and slip ejection sensor 49 is less than the length L2 of the check S, the leading end of the check S can normally be detected by the slip ejection sensor 49 even if the trailing end of the check S has advanced beyond the middle of paper pass sensor 47.

The middle of paper pass sensor 47 is disposed so that it can reliably detect removal of a check S that is shorter than the distance between the top of form sensor 43 and the slip ejection sensor 49 on the medium conveyance path 5. As a result, detecting removal of a check S based on a state change from a state in which the middle of paper pass sensor 47 is on to a state in which the middle of paper pass sensor 47, top of form sensor 43, and slip ejection sensor 49 are all off is therefore desirable. This enables reliably determining if the check S was discharged from the recording medium exit 4 in the course of normal operation, or was erroneously pulled out by a user while printing.

If it is determined that the check S was pulled out (step S55), the CPU 101 sends a status report telling the host computer 200 that the check was pulled out (step S56).

As described above, a hybrid processing device 1 according to some exemplary embodiments has at least three sensors, and can reliably determine when the check S is removed by means of a simple configuration.

Because the presence of a check S is detected based on the difference between emitter-OFF read and emitter-ON read values, incorrect detection results due to ambient light can be minimized.

In this embodiment of the invention the top of form sensor 43, middle of paper pass sensor 47, and slip ejection sensor 49 detect check S presence at a specific interval T2, and the presence or absence of the check is confirmed when the same detection result is obtained twice consecutively, improving the accuracy even if the ambient light is strong.

Furthermore, because the middle of paper pass sensor 47 is located a distance which is less than the length of the check, the detection results are more accurate yet.

Because the middle of paper pass sensor 47 is disposed between the first printhead 46 and the second printhead 48, other parts can be efficiently arranged, and removal of a check S an be reliably detected.

Exemplary embodiments of the invention are described above, but the invention is not so limited. For example, the roll paper print unit 13 may not be included.

Exemplary types of printheads have been described, but the invention is not limited thereto.

In addition, a program that causes the CPU 101 to perform the methods described herein can be stored to and read and executed from a non-transitory recording medium within the hybrid processing device 1 or a transitory or non-transitory storage medium that is externally connected.

The invention being thus described, it will be apparent that it may be varied in many ways. Such variations are not to be regarded as a departure from the spirit and scope of the invention, and all such modifications as would be apparent to those of ordinary skill in the art, based on the teachings herein, are intended to be included within the scope of the following claims.

What is claimed is:

1. An apparatus, comprising:
   a case defining a conveyance path therein, the path defining a recording medium entrance and a recording medium exit, the path further being configured for a recording medium to be conveyed along the path from the entrance to the exit;
   a recorder disposed adjacent the conveyance path and configured to record information on the recording medium;

a pair of first conveyance rollers configured to convey the recording medium from the recording medium entrance to a position farther downstream the conveyance path;

a pair of second conveyance rollers configured to discharge the recording medium from within the conveyance path out through the recording medium exit;

a first recording medium detector adjacent the conveyance path downstream of the first conveyance rollers, configured to detect whether the recording medium is present;

a second recording medium detector adjacent the conveyance path upstream of the second conveyance rollers and downstream of the first recording medium detector, configured to detect whether the recording medium is present;

a third recording medium detector downstream of the recording medium exit adjacent a line extending from the conveyance path, configured to detect whether the recording medium is present; and a device for determining that the recording medium has been removed from the conveyance path past the third recording medium detector when the recording medium detectors change from a first state, in which the second recording medium detector detects that the recording medium is present, to a second state, in which none of the recording medium detectors detect that the recording medium is present, without requiring the third recording medium detector to detect that the recording medium is present during the state change.

2. The apparatus of claim 1, further comprising a fourth recording medium detector adjacent the conveyance path between the entrance and the pair of first rollers, configured to detect whether the recording medium is present.

3. The apparatus of claim 1, further comprising a reader configured to obtain information from the recording medium, disposed adjacent the conveyance path.

4. The apparatus of claim 3, wherein the reader comprises a magnetic ink character recognition head.

5. The apparatus of claim 3, wherein the reader is disposed between the entrance and the pair of first rollers.

6. The apparatus of claim 5, further comprising a fourth recording medium detector adjacent the conveyance path between the entrance and the pair of first rollers, upstream from the reader, configured to detect whether the recording medium is present.

7. The apparatus of claim 1, wherein:
at least one of the first recording medium detector, second recording medium detector, and third recording medium detector comprises a photosensor comprising a light-emitting device and a photodetector,
performs an emitter-OFF reading operation that detects the light sensed by the photodetector when the light-emitting device does not emit, and an emitter-ON reading operation that detects the light sensed by the photodetector when the light-emitting device emits, and
detects when the recording medium is present based on the difference between the values detected in the emitter-OFF and emitter-ON reading operations.

8. The apparatus of claim 1, wherein the first recording medium detector, second recording medium detector, and third recording medium detector periodically operate to detect when the recording medium is present, and the determining device determines whether the recording medium is present when the same detection result is received at two consecutive operations.

9. The apparatus of claim 1, wherein a distance between the second recording medium detector and the third recording medium detector, measured along the conveyance path, is less than a length of the recording medium.

10. The apparatus of claim 1, wherein the recorder comprises a first recorder configured to record on a first face of the recording medium, and a second recorder configured to record on a second face of the recording medium.

11. The apparatus of claim 10, wherein the first recorder is disposed between the first recording medium detector and the second recording medium detector, and the second recorder is disposed between the second recording medium detector and the third recording medium detector.

12. The apparatus of claim 1, wherein the conveyance path is substantially a straight path from adjacent the second recording medium detector to the recording medium exit towards the third recording medium detector.

13. An apparatus, comprising:
a case defining a conveyance path therein, the path defining a recording medium entrance and a recording medium exit, the path further being configured for a recording medium to be conveyed along the path from the entrance to the exit;

a recording means disposed adjacent the conveyance path, for recording information on the recording medium;

a pair of first conveyance means for conveying the recording medium from the recording medium entrance to a position farther downstream the conveyance path;

a pair of second conveyance means for discharging the recording medium from within the conveyance path out through the recording medium exit;

a first recording medium detection means for detecting whether the recording medium is present, adjacent the conveyance path downstream of the first conveyance mean;

a second recording medium detection means for detecting whether the recording medium is present, adjacent the conveyance path upstream of the second conveyance means and downstream of the first recording medium detection means;

a third recording medium detection means for detecting whether the recording medium is present, downstream of the recording medium exit adjacent a line extending from the conveyance path; and a decision means for determining that the recording medium has been removed from the conveyance path past the third recording medium detector when the recording medium detection means change from a first state, in which the second recording medium detection means detects that the recording medium is present, to a second state, in which none of the recording medium detection means detect that the recording medium is present, without requiring the third recording medium detection means to detect that the recording medium is present during the state change.

14. A control method for a medium processing device, the device comprising a case defining a conveyance path therein, the path defining a recording medium entrance and a recording medium exit, the path further being configured for a recording medium to be conveyed along the path from the entrance to the exit, the device further comprising a first and a second recording medium detector disposed adjacent the conveyance path, and third recording medium detector disposed downstream of the recording medium exit adjacent a line extending from the conveyance path, the method comprising:

receiving data regarding the presence or absence of a recording medium from the recording medium detectors; and determining that the recording medium has been removed from the conveyance path past the third recording medium detector when the recording medium detectors change from a first state, in which the second recording medium detector detects that the recording medium is present, to a second state, in which none of the recording medium detectors detect that the recording medium is present, without requiring the third recording medium detector to detect that the recording medium is present during the state change.

15. The method of claim 14, wherein at least one of the first recording medium detector, second recording medium detector, and third recording medium detector comprises a photosensor comprising a light-emitting device and a photodetector, the method further comprising:

performing an emitter-OFF reading operation that detects the light sensed by the photodetector when the light-emitting device does not emit, and an emitter-ON reading operation that detects the light sensed by the photodetector when the light-emitting device emits, and detecting when the recording medium is present based on the difference between the values detected in the emitter-OFF and emitter-ON reading operations.

16. The method of claim 14, further comprising operating the recording medium detectors periodically to detect if the recording medium is present; and determining whether the recording medium is present when the same detection result is received at two consecutive operations.

17. The method of claim 14, further comprising controlling the device to convey the recording medium along the conveyance path when the recording medium is determined to be present.

18. The method of claim 14, further comprising putting the device in a standby mode when it is determined that the recording medium has been removed.

19. The method of claim 14, wherein the device further comprises a recorder disposed adjacent the conveyance path, the method further comprising recording information on the recording medium with the recorder.

20. The method of claim 19, wherein the recorder comprises a first and a second recorder, the method further comprising recording information on a first face of the recording medium with the first recorder, and recording information on a second face of the recording medium with the second recorder.

21. The method of claim 14, wherein the device further comprises a reader disposed adjacent the conveyance path, the method further comprising obtaining information from the recording medium with the reader.

* * * * *